Patented Dec. 5, 1939

2,182,347

UNITED STATES PATENT OFFICE 2,182,347

AZO COMPOUND

Arthur R. Murphy, deceased, late of Penns Grove, N. J., by Margaret R. Murphy, administratrix, Penns Grove, N. J., and Henry Jordan, Wilmington, Del., assignors to E. I. du Pont de Nemours & Company, Wilmington, Del., a corporation of Delaware No Drawing. Application July 7, 1937, Serial No. 152,364

6 Claims. (Cl. 260—171)

This invention relates to new azo dyes and especially to amino-aroyl condensation products of azo combinations in which diazotized aryl amine is coupled with a meta-arylene-diamine group which contains one or more amino benzoyl groups so as to provide a plurality of diazotizable end groups.

An object of the invention is to provide soluble dyestuffs which will dye cotton, rayon, regenerated cellulose and similar substances from a water bath. Another object is to provide dyestuffs with which fibre can be dyed directly and thereafter the dye can be diazotized on the fibre and developed with an azo dye coupling component to give dyeings of increased strength to fastness and washing. Another object of the invention is to provide processes for making the compounds. Other objects of the invention will be apparent from the following more detailed description.

The objects of the invention are attained generally by coupling a diazotized arylamine of the benzene or naphthalene series with a meta-arylene diamine, condensing the azo combination with one or more equivalents of a nitro-aroyl halide and reducing the nitro group or groups. One or more of the end amino groups may be condensed with a nitro-aroyl halide and the nitro groups reduced.

The invention is illustrated but not limited by the following examples:

Example 1

A solution of 303 parts of 2-naphthylamine-5:7-disulfonic acid were dissolved in 6000 parts of water, acidified with 210 parts of a 31% hydrochloric acid solution, cooled with ice to about 5° C. and diazotized with a sodium nitrite solution containing 69 parts of sodium nitrite, while maintaining a temperature of 5° to 10° C. To the diazo solution was added a solution of 227 parts of mono meta aminobenzoyl-m-phenylene diamine in 5000 parts of water and 250 parts of a 31% hydrochloric acid solution. The mineral acidity of the coupling was neutralized by the addition of about 700 parts of crystallized sodium acetate. After stirring over night at 20–25° C. the coupling was completed. The mixture was acidified with hydrochloric acid until acid to Congo red, heated to 60° C. and then filtered.

The acid filter cake was dissolved in an alkaline solution containing 12,000 parts of water and 150 parts of sodium carbonate which was heated to 85 to 90° C. While maintaining a rapid agitation at a temperature of 85° to 90° C. there was added 400 parts of para-nitro-benzoyl chloride in small portions and at the same time sodium carbonate in small amounts was added to keep the reaction slightly alkaline. When the condensation was complete, the color of a sample in dilute solution was yellow and was not sensitive to acetic acid. The color of the uncondensed dye was dull red. The condensation product was completely precipitated with about 1000 parts of salt and filtered.

The filter cake was stirred up with 15,000 parts of water, heated to 80 to 85° C. and reduced with sodium disulfide solution containing 330 parts of $Na_2S_2$. The difficultly soluble nitro product was thus reduced to the easily soluble amino compound. The amino benzoyl derivative was completely precipitated with 1500 parts of salt and filtered.

The dry dye in powder form has an orange color. It is soluble in water giving a bright yellow coloration. It dyes cotton and regenerated cellulose bright yellow shades. The dyeings, after diazotizing on the fiber and development with beta naphthol, are bright orange in shade and show considerable increase in strength. The developed dyeings show an excellent fastness to washing. They will give a pure white discharge with an alkaline reducing medium. Development with phenyl-methyl-pyrazolone will produce bright yellow shades of excellent fastness to washing and excellent dischargeability.

The new dye probably has the following formula:

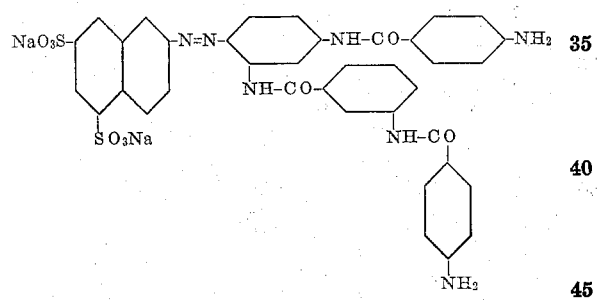

Example 2

A solution containing 223 parts of 2-naphthylamine-6-sulfonic acid, 6000 parts of water and 53 parts of sodium carbonate was made. The solution was acidified with 350 parts of a 31% hydrochloric acid solution, cooled with ice to 10° C. and diazotized with a solution containing 69 parts of sodium nitrite. The diazo suspension was allowed to run into a solution of 223 parts of 1-naphthylamine-6-sulfonic acid in 5000 parts of water, containing 53 parts of sodium carbonate and 450 parts of sodium acetate crystals. The coupling medium showed an acid reaction to litmus but neutral to Congo red paper. After stirring over night at 20 to 25° C. the coupling was complete.

The mixture was acidified with 350 parts of a 30% hydrochloric acid solution and diazotized at 15 to 20° C. with 69 parts of sodium nitrite. After stirring for about two hours, the diazotization was completed.

The charge was filtered and the filter cake was stirred with 3000 parts of water until it was well broken up. Then a solution of 227 parts of mono meta aminobenzoyl-m-phenylene diamine in 5000 parts of water and 250 parts of a 31% hydrochloric acid solution was added. The coupling medium was immediately treated with about 500–550 parts of sodium acetate crystals and a temperature of 15 to 20° C. was maintained. The strong litmus acidity of the coupling medium was then reduced to a weak litmus acid reaction by the addition of a sodium carbonate solution. After stirring over-night the coupling was complete. The charge was heated to 60° C., acidified to a Congo acid reaction with hydrochloric acid, treated with about 600 parts of salt and filtered.

The acid filter cake was stirred up in 12,000 parts of water, made alkaline with 150 parts of sodium carbonate, and heated to 85 to 90° C. Then, while maintaining a rapid agitation, 400 parts of para-nitro-benzoyl chloride were slowly added. At the same time a sodium carbonate solution was added in order to keep the reaction slightly alkaline. The condensation product precipitated practically completely, being only slightly soluble in water. In a dilute boiling solution it showed an orange coloration, and it was not sensitive to acetic acid. The uncondensed dye was soluble giving a chocolate brown color and it was sensitive to acid. After the condensation was complete, the dye was filtered.

The nitro body was stirred with 15,000 parts of water, heated to 80 to 85° C. and reduced with a sodium disulfide solution containing 330 parts of Na2S2. The reduction was complete in 30 to 45 minutes, and the insoluble nitro benzoyl compound was completely converted into the soluble amino benzoyl dye.

The reduced product was precipitated with 1500 parts of salt and filtered. In its dry ground form it was a dark brown powder, soluble in water, forming a bright reddish brown solution. It dyes the vegetable fibers bright reddish brown shades. The dyeings, upon diazotization and development with the beta naphthol produce red shades, which are much stronger and brighter. The developed dyeings show an excellent fastness to washing and will discharge to a pure white color with an alkaline reducing medium. Dyeings, developed with phenyl methyl pyrazolone instead of beta naphthol, produce bright orange-brown shades of similar properties.

The new dye probably has the following formula:

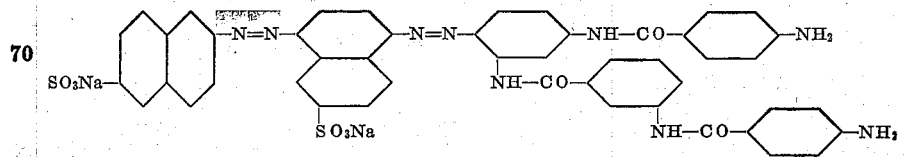

Example 3

A solution was made by disolving 303 parts of 2-naphthylamine-6:8-disulfonic acid in 6000 parts of water which was acidified with 210 parts of a 31% hydrochloric acid solution. The solution was cooled with ice to about 10° C. and then diazotized with a sodium nitrite solution, containing 69 parts of sodium nitrite, whilst maintaining a temperature at 10–15° C. To the diazo solution, which should show no excess nitrous acid, there was added a solution of 107 parts of m-toluidine in 1500 parts of water and 120 parts of a 31% hydrochloric acid solution. The coupling medium was immediately neutralized by adding about 450 parts of sodium acetate crystals. The coupling medium should be neutral to Congo red paper. The temperature was slowly raised to 40° C. and the coupling was completed in about two hours. A few drops of the coupling medium added to a dilute sodium carbonate solution gave a bright orange solution. A test made with a dilute alkaline H-acid solution gave the same coloration. In case of incomplete coupling the H-acid test would show a dull shade, caused by a mixture of orange and violet.

The monoazo dye was isolated by saturating the coupling with salt and filtering. The acid filter cake was dissolved in 5000 parts of water containing 45 parts of sodium hydroxide. The solution was acidified with 280 parts of a 31% hydrochloric acid solution, cooled to 20–23° C. and diazotized with 63 parts of sodium nitrite. A test for a slight excess nitrous acid should be maintained for about 30 minutes. The mineral acid reaction of the diazotization was now neutralized completely by addition of about 350 parts of sodium acetate crystals. Then there was added a solution of 107 parts m-toluidine in 1500 parts of water and 120 parts of a 31% hydrochloric acid solution. After 30 minutes the strong litmus acidity was reduced to a weak litmus acid reaction by the addition of a solution containing about 80 parts of sodium carbonate. After stirring over-night at about 25° C. the coupling was complete. The coupling medium was now made distinctly alkaline by the addition of 200 parts of sodium carbonate. Then it was heated to 80° C. and 140 parts of charcoal were added. The hot solution was filtered. The filtered solution of the disazo dye was treated with salt and the resulting mass was filtered.

The filter cake was stirred up with 5000 parts of water, acidified with 280 parts of a 31% hydrochloric acid solution, and then diazotized at 20 to 25° C. with a sodium nitrite solution containing about 45–49 parts of sodium nitrite. The diazotization mixture was stirred until there was no more free nitrous acid present. This step required about one hour. The diazotization mixture was then made neutral to Congo red paper by the addition of sodium acetate (about 400 parts of acetate crystals). A solution of 180 parts of mono para aminobenzoyl-m-phenylene diamine in 3000 parts of water which contained 190 parts of a 31% hydrochloric acid solution was added. The acid (to litmus) reaction of the coupling medium was reduced by the slow addition of sodium carbonate (about 400 parts). The temperature of the coupling should be 20–25° C. After stirring over-night the coupling was complete. The charge was heated to 75° C., made acid to Congo red paper with hydrochloric acid, and then filtered. The acid dye was converted into the sodium salt by stirring with 10,000 parts of water and adding 120 parts of sodium carbonate. The solid product was removed by filtration after the charge was heated to 80° C. and treated with 1000 parts of salt.

The new dye in dry form is a deep brown powder, soluble in water giving an orange brown coloration. It dyes vegetable fibers reddish brown shades. The dyeings, after diazotizing on the fiber and developing with beta napthol, are a deep chocolate brown in shade. They show an excellent fastness to washing and will discharge to a pure white with an alkaline reducing medium. When developed with 1-phenyl-3-methyl-5-pyrazolone, the resulting shade is a bright orange brown. The dyeings have similar properties to the beta naphthol dyeings.

The new dye probably has the following formula:

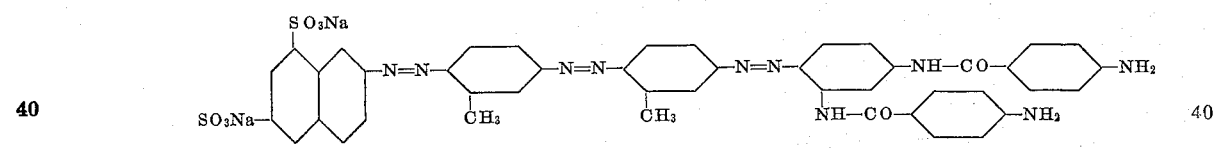

This dye may be condensed again with two moles of p-nitrobenzoyl chloride and the NO$_2$ group then reduced with sodium disulfide, representing a dye of the following formula:

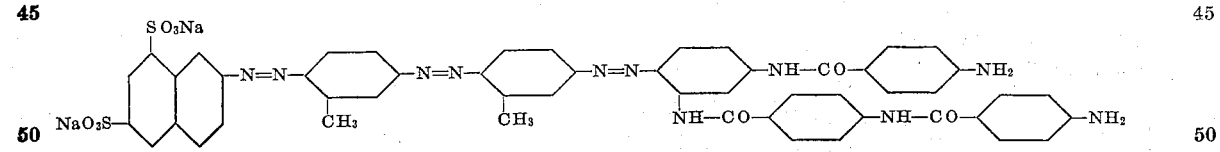

This dye will yield much yellower shades of brown both on direct and developed dyeings than the dye described above. The fastness properties are similar.

*Example 4*

The end component in Example 3 (p-aminobenzoyl-m-phenylene diamine) was replaced by 108 parts of m-phenylene diamine, dissolved in 1500 parts of water. The mineral acidity of the coupling mixture was completely neutralized with sodium acetate. The coupling was complete in about 30 minutes. It was then converted to the sodium salt by the addition of 300 parts of sodium carbonate. The solution was heated to 70–75° C., salted with 1000 parts of salt and the resulting mass was filtered.

The filter cake was stirred with 15,000 parts of water, heated to 90° C., and, while maintaining a rapid agitation, 400 parts of p-nitro-benzoyl chloride were slowly added. At the same time a sodium carbonate solution was slowly added to keep the reaction distinctly alkaline. The dinitro benzoyl product was completely precipitated, being only very little soluble in water. A dilute boiling solution of the nitro body showed a yellowish orange coloration, when spotted on filter paper. It was not sensitive to acetic acid. The precipitate was removed by filtration.

The filter cake was stirred with 15,000 parts of water, heated to 85–90° C. and then reduced with a sodium disulfide solution containing 330 parts of Na$_2$S$_2$. The reduction was complete after 2–3 hours stirring at 85–90° C. The insoluble nitro body was thus reduced to the soluble diaminobenzoyl compound. The dye was salted out with 1000 parts of salt and separated by filtration.

In its dry form this dye is a dark brown powder. It is soluble in water forming an orange brown solution. It dyes vegetable fibers orange brown shades. The dyeings, after diazotization on the fiber and development with beta naphthol, produce deep brown shades. The developed dyeings show an excellent fastness to washing and are discharged to a pure white by an alkaline reducing agent.

The new dye probably has the following formula:

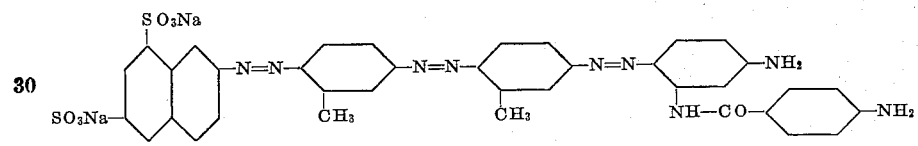

The following products prepared in a similar manner, further illustrate the invention. The products are termed amino aroyl derivatives of the amino azo dyes. The compositions of the products are indicated as follows: The expression (MAB) and (PAB) are abbreviations for meta-amino benzoyl and para-amino-benzoyl, respectively. The arrows indicate that the diazo of the amino group, from which the arrows point, has been coupled to the coupling component, to which the arrows point. The abbreviations MPD and MTD stand for meta-phenylene diamine and meta toluylene diamine, respectively.

For example, the composition of the product of Example 1 is indicated by the following expression:

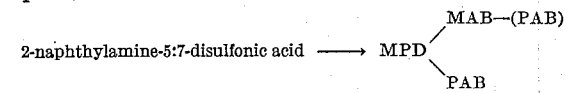

which means that mono (amino-benzoyl)-m-phenylene diamine has been coupled to diazotized 2-naphthylamine-5:7-disulfonic acid, the product subsequently condensed with two moles of a p-nitro-benzoyl halide, and the two nitro groups were subsequently reduced.

| | Combination | Shade of dyeing | |
|---|---|---|---|
| | | Direct | Developed (beta-naphthol) |
| 5 | 2-naphthylamine 6:8-disulfonic acid ⟶ MPD ⟨(MAB)—(PAB) / (PAB)⟩ | Yellow | Yellow-orange. |
| 6 | 2-naphthylamine-4:8-disulfonic acid ⟶ cresidine ⟶ MPD (MAB) | Maroon | Maroon-brown. |
| 7 | 2-naphthylamine-4:8-disulfonic acid ⟶ cresidine ⟶ MPD ⟨(MAB)—(PAB) / (PAB)⟩ | Orange | Reddish-orange. |
| 8 | 2-naphthylamine-4:8-disulfonic acid ⟶ alpha naphthyl amine ⟶ MPD ⟨(MAB)—(PAB) / (PAB)⟩ | Reddish-brown | Bright reddish-brown. |
| 9 | Metanilic ⟶ 1-naphthylamine-7-sulfonic acid ⟶ meta toluidine ⟶ MPD (MAB). | Maroon | Maroon-brown. |
| 10 | Metanilic ⟶ 1-naphthylamine-7-sulfonic acid ⟶ meta toluidine ⟶ MPD ⟨(MAB)—(PAB) / (PAB)⟩ | Reddish-brown | Orange-brown. |
| 11 | 2-naphthylamine-6:8-disulfonic acid ⟶ meta toluidine (PAB) ⟶ MPD ⟨(MAB)—(PAB) / (PAB)⟩ | Yellow | Orange. |
| 12 | 2-naphthylamine-6:8-disulfonic acid ⟶ meta toluidine ⟶ meta toluidine ⟶ MPD (MAB). | Chocolate-brown | Chocolate-brown. |
| 13 | 2-naphthylamine-6:8-disulfonic acid ⟶ meta toluidine ⟶ 1-naphthylamine-6-sulfonic acid ⟶ MPD (MAB) | Maroon-brown | Maroon-brown. |
| 14 | 2-naphthylamine-6:8-disulfonic acid ⟶ meta toluidine ⟶ 1-naphthylamine-6-sulfonic acid ⟶ MPD ⟨(MAB)—(PAB) / (PAB)⟩ | Reddish-brown | Reddish-brown. |
| 15 | 2-naphthylamine-6:8-disulfonic acid ⟶ alpha naphthylamine ⟶ MPD (MAB) | Maroon-brown | Maroon-brown. |
| 16 | 2-naphthylamine-6:8-disulfonic acid ⟶ alpha naphthylamine ⟶ MPD ⟨(MAB)—(PAB) / (PAB)⟩ | Reddish-brown | Reddish-brown. |
| 17 | 2-naphthylamine-6:8-disulfonic acid ⟶ cresidine ⟶ meta toluidine ⟶ MPD (MAB) | Maroon-brown | Maroon-brown. |
| 18 | 2-naphthylamine-6:8-disulfonic acid ⟶ meta toluidine ⟶ cresidine ⟶ MPD (MAB). | Chocolate-brown | Chocolate-brown. |
| 19 | 2-naphthylamine-6:8-disulfonic acid ⟶ alpha naphthylamine ⟶ meta toluidine ⟶ MPD (MAB) | Maroon-brown | Maroon-brown. |
| 20 | 2-naphthylamine-6:8-disulfonic acid ⟶ 2.5 dimethoxy aniline ⟶ meta toluidine ⟶ MPD (MAB) | Violet-brown | Violet-brown. |
| 21 | 2-naphthylamine—6:8-disulfonic acid ⟶ meta toluidine ⟶ MPD ⟨(PAB) / (PAB)⟩ | Yellow-orange | Reddish-orange. |
| 22 | 2-naphthylamine-6:8-disulfonic acid ⟶ meta toluidine ⟶ MPD ⟨(MAB)—(PAB) / (PAB)⟩ | ...do... | Yellow-orange. |
| 23 | 2-naphthylamine-6:8-disulfonic acid ⟶ cresidine ⟶ MPD ⟨(MAB)—PAB / (PAB)⟩ | Reddish-orange | Reddish-orange. |

| | Combination | Shade of dyeing | |
|---|---|---|---|
| | | Direct | Developed (beta-naphthol) |
| 24 | 2-naphthylamine-6:8-disulfonic acid ⟶ meta toluidine (PAB) ⟶ meta toluidine ⟶ MPD (MAB) | Reddish-brown | Reddish-brown. |
| 25 | 2-naphthylamine-6:8-disulfonic acid ⟶ meta toluidine ⟶ meta toluidine ⟶ MPD⟨(PAB)/(PAB)⟩ | Yellow-brown | Orange-brown. |
| 26 | 2-naphthylamine-6:8-disulfonic acid ⟶ meta toluidine ⟶ meta toluidine ⟶ MPD (PAB) | ___do___ | Chocolate-brown. |
| 27 | 2-naphthylamine-6:8-disulfonic acid ⟶ cresidine ⟶ meta toluidine ⟶ MPD (PAB) | Chocolate-brown | Maroon-brown. |
| 28 | 2-naphthylamine-6-sulfonic acid ⟶ 1-naphthylamine-6-sulfonic acid ⟶ MPD (MAB) | ___do___ | Chocolate-brown. |
| 29 | 2-naphthylamine-6-sulfonic acid ⟶ 1-naphthylamine-6-sulfonic acid ⟶ MPD⟨(MAB)—(PAB)/(PAB)⟩ | Reddish-brown | Bright reddish brown. |
| 30 | 2-naphthylamine-6-sulfonic acid ⟶ 1-naphthylamine-6-sulfonic acid ⟶ meta toluidine ⟶ MPD (MAB) | Chocolate-brown | Maroon-brown. |
| 31 | 2-naphthylamine-6-sulfonic acid ⟶ 1-naphthylamine-6-sulfonic acid ⟶ MPD⟨(PAB)/(PAB)⟩ | Reddish-brown | Bright reddish-brown. |
| 32 | 2-naphthylamine-6-sulfonic acid ⟶ 1-naphthylamine-6-sulfonic acid ⟶ MPD⟨(PAB)—(PAB)/(PAB)⟩ | ___do___ | Do. |
| 33 | 2-naphthylamine-4:8-disulfonic acid ⟶ 2:5 dimethoxy aniline ⟶ MPD⟨(PAB)/(PAB)⟩ | Yellowish bordeaux. | Bluish bordeaux. |
| 34 | Benzidine⟨2-amino-8-naphthol-3:6-disulfonic acid ⟶ MPD (MAB) / MPD (MAB)⟩ | Maroon-brown | Violet-brown. |
| 35 | Aminoazobenzene disulfonic acid ⟶ (MPD)⟨(PAB)—(PAB)/(PAB)—(PAB)⟩ | Bright orange | Bright orange. |
| 36 | 1-amino-8-naphthol-3:6-disulfonic acid ⟶ alpha naphthylamine ⟶ (MPD)⟨(PAB)/(PAB)⟩ | Maroon-brown | Chocolate-brown. |
| 37 | 1-amino-8-naphthol-3:6-disulfonic acid ⟶ cresidine ⟶ MPD⟨(PAB)/(PAB)⟩ | Chocolate-brown | Do. |
| 38 | 1-amino-8-naphthol-3:6-disulfonic acid ⟶ cresidine ⟶ MTD (PAB) | ___do___ | Violet-brown. |
| 39 | 2-naphthylamine-6:8-disulfonic acid ⟶ cresidine ⟶ meta toluidine ⟶ MPD sulfonic (PAB) | Bordeaux-brown | Maroon-brown. |
| 40 | Benzidine⟨MPD sulfonic—(PAB) / MPD sulfonic—(PAB)⟩ | Orange | Do. |
| 41 | 2-naphthylamine-6:8-disulfonic acid ⟶ cresidine ⟶ MTD (PAB) | Chocolate-brown | Violet-brown. |

| | Combination | Shade of dyeing | |
|---|---|---|---|
| | | Direct | Developed (beta-naphthol) |
| 42 | Sulfanilic (alkaline) 2-amino-5-naphthol-7-sulfonic acid ⟶ ⟵⟶ (PAB) MPD (PAB) | Bordeaux | Bordeaux. |
| 43 | Aminoazobenzene monosulfonic acid ⟶ 1-naphthylamine-6-sulfonic acid ⟶ (PAB) MPD (PAB) | Bordeaux-brown | Bordeaux-brown. |
| 44 | 2-naphthylamine-6:8-disulfonic acid ⟶ aniline ⟶ meta-toluidine ⟶ (PAB) MPD (PAB) | Orange-brown | Deep orange-brown. |
| 45 | 1-amino-8-naphthol-3:6-disulfonic acid (alkaline) aniline Benzidine (PAB) MPD (PAB) | Dark green | Reddish-black. |
| 46 | 1-amino-8-naphthol-3:6-disulfonic acid (alkaline) aniline Benzidine MPD (PAB) | Green | Do. |
| 47 | 1-amino-8-naphthol-3:6-disulfonic acid (alkaline) aniline Benzidine (PAB)—(PAB) MPD (PAB) | ...do... | Do. |

The coupling component contains essentially a meta-arylene-diamine nucleus, and preferably contains one or more amino-benzoyl-amino nuclei, thereby providing at least two primary amino end groups which are capable of diazotization. The diazotizable amino groups are preferably present in the benzoyl nuclei. Such diazotizable amino groups may be substituted on the nucleus of the arylene diamine, or on both nuclei. In making the compounds the coupling is always made to the aryl nucleus of the arylene diamine.

Only arylene diamines having amino groups in alternate positions, such as meta-arylene diamines can be used in making the compounds and at least one para position of this nucleus must have no substituent group. The arylene diamine is desirably a compound of the benzene series, meta-phenylene diamine and meta-toluylene diamine being preferred, but meta-arylene diamines of the naphthalene series having amino groups in alternate positions, such as the 1:3-diamino naphthalenes can be used.

The aryl nucleus of the diamine and of the benzoyl groups may be substituted by halogen, alkyl, alkoxy, sulphonic acid and carboxyl.

The diazo components may be monazo or polyazo combinations, the aryl nuclei of which are from the benzene and naphthalene compounds, and they may be nuclei of benzene, benzidine or naphthalene compounds. The aryl nuclei of the diazo components may be substituted by hydroxy, alkyl, alkoxy, amino and the solubilizing groups, carboxy and sulphonic acid.

One or more solubilizing groups are preferably substituted in an aryl nucleus of the diazo component, but the solubilizing group or groups may be present in the coupling component. The compounds which contain two or more solubilizing groups generally have excellent solubility. When the diazo component contains a naphthalene nucleus, it is convenient to employ a naphthalene disulphonic acid compound as a primary aryl amine.

The term "solubilizing groups" in the specification and claims refers to the groups carboxy and sulphonic acid, and the term aryl refers to compounds of the benzene and naphthalene series.

As a general rule the monazo compounds which contain a relatively small number of aminobenzoyl amino groups are least substantive. The ones which are more substantive are those which contain polyazo combinations and a larger number of amino-benzoyl amino groups. Substantivity is increased by condensing a plurality of amino aroyl groups on at least one amino of the meta arylene diamine radical, and also by coupling to polyazo components. Such compounds are preferred from the standpoint of substantivity. Both of these characteristics may be present, but such is not essential since excellent substantivity can be obtained when one or the other, is present.

In preparing the compounds of the invention the diazo component is generally coupled to a meta-arylene-diamine and then condensed with a meta- or para-nitro-aroyl halide and the nitro group is then reduced. As an alternative the coupling component may be completed and then coupled instead of building up the coupling component by condensations after coupling.

For the purposes of building up the coupling component para-nitro-benzoyl halides are preferred. The condensation of nitro-aroyl halides with the meta-arylene-diamines is hindered by the presence of sulphonic acid groups in the meta-arylene-diamine nucleus adjacent to an amino group, and it is preferable to avoid sulphonic acid groups in this position where more than one amino group is to enter into the condensation. Otherwise the condensation may take place with one or two primary amino groups of the meta diamine nucleus.

As illustrated in the examples a plurality of condensations may be made by acting upon any primary amino group with a substituted or unsubstituted nitro-benzoyl-chloride and then reducing the nitro to give a diazotizable group.

As many modifications of the invention will be apparent to those skilled in the art without departing from the spirit and scope of the invention, it is to be understood that no limitations are intended in the annexed claims except those which are specifically set forth or are imposed by the prior art.

We claim:

1. A dye which in the form of its acid is represented by the formula $$Aryl-N=N-(Aryl_1-N=N-)_{n-1}-(Aryl_2-N=N-)_{n-1}-R$$

in which Aryl is the residue after diazotization of one of a group consisting of naphthylamine mono- and di-sulfonic acids, amino naphthol di-sulfonic acids and amino-benzene mono-sulfonic acids; $Aryl_1$ and $Aryl_2$ are each from the group consisting of the residues of amino-benzene, amino-benzene substituted not more than twice by at least one of a group consisting of alkyl and alkoxy, amino-benzene mono-sulfonic acids, amino-benzoylamino toluidines, naphthylamine and naphthylamine mono-sulfonic acids; each $n$ is an integer not more than 2; R is one of a group consisting of

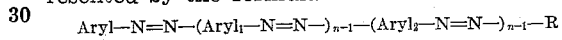

wherein H designates the coupling position, one X is one of a group consisting of amino and

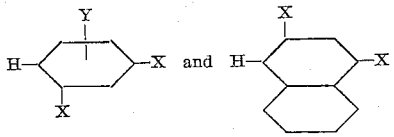

wherein Z is one of a group consisting of amino and amino-benzoylamino and the amino groups are in one of the positions meta and para to —CO—, and the other X is

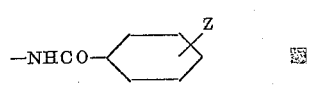

Y is one of a group consisting of hydrogen and methyl; said compound having at least two solubilizing groups.

2. A dye which in the form of its acid is represented by the formula

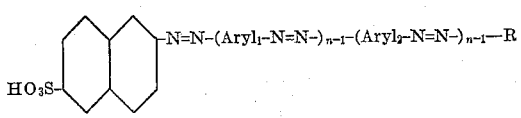

in which $Aryl_1$ and $Aryl_2$ are each from the group consisting of the residues of amino-benzene, amino-benzene substituted not more than twice by at least one of a group consisting of alkyl and alkoxy, amino-benzene mono-sulfonic acids, amino-benzoylamino toluidines, naphthylamine and naphthylamine mono-sulfonic acids; each $n$ is an integer not more than 2; R is one of a group consisting of

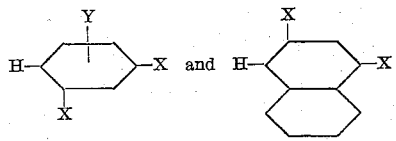

wherein H designates the coupling position, one X is one of a group consisting of amino and

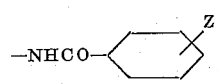

wherein Z is one of a group consisting of amino and amino-benzoylamino and the amino groups are in one of the positions meta and para to —CO—, and the other X is

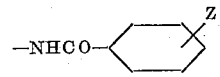

Y is one of a group consisting of hydrogen and methyl; said compound having at least two solubilizing groups.

3. A dye which in the form of its acid is represented by the formula

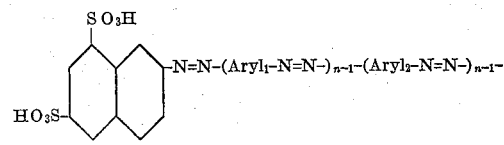

in which $Aryl_1$ and $Aryl_2$ are each from the group consisting of the residues of amino-benzene, amino-benzene substituted not more than twice by at least one of a group consisting of alkyl and alkoxy, amino-benzene mono-sulfonic acids, amino-benzoylamino toluidines, naphthylamine and naphthylamine mono-sulfonic acids; each $n$ is an integer not more than 2; R is one of a group consisting of

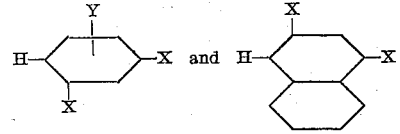

wherein H designates the coupling position, one X is one of a group consisting of amino and

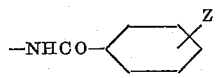

wherein Z is one of a group consisting of amino and amino-benzoylamino and the amino groups are in one of the positions meta and para to —CO—, and the other X is

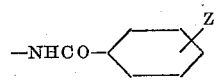

Y is one of a group consisting of hydrogen and methyl.

4. The compound represented by the formula:
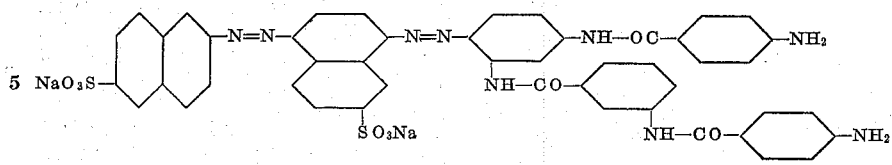
5. The compound represented by the formula:
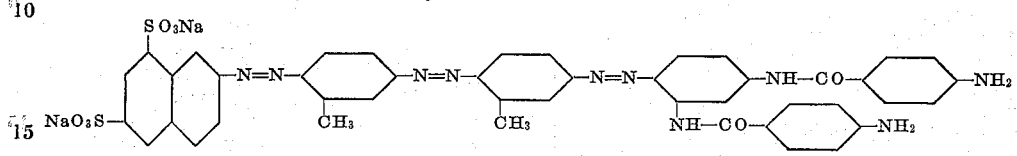
6. The compound represented by the formula:
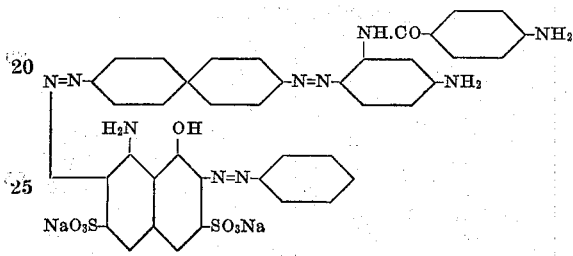
MARGARET R. MURPHY,
*Administrator of the Estate of Arthur R. Murphy, deceased.*
HENRY JORDAN.